US008489231B2

(12) United States Patent
Brandt et al.

(10) Patent No.: US 8,489,231 B2
(45) Date of Patent: Jul. 16, 2013

(54) LOOP MAIL PROCESSING

(75) Inventors: William R. Brandt, Redmond, WA (US); Gregor Nitsche, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 327 days.

(21) Appl. No.: 12/883,965

(22) Filed: Sep. 16, 2010

(65) Prior Publication Data

US 2011/0071665 A1 Mar. 24, 2011

Related U.S. Application Data

(60) Provisional application No. 61/243,777, filed on Sep. 18, 2009.

(51) Int. Cl.
*G06F 7/00* (2006.01)
*G06K 9/00* (2006.01)

(52) U.S. Cl.
USPC ........... 700/227; 700/224; 700/222; 700/221; 700/223; 700/226; 700/230; 209/584

(58) Field of Classification Search
None
See application file for complete search history.

(56) References Cited

U.S. PATENT DOCUMENTS 3,884,370 A 5/1975 Bradshaw
3,933,094 A 1/1976 Murphy
4,158,835 A 6/1979 Miura
4,475,234 A 10/1984 Nishijima
4,606,660 A 8/1986 Bradshaw
4,828,104 A 5/1989 Ribellino, Jr.
4,845,761 A 7/1989 Cate
4,998,626 A 3/1991 Ota
5,008,827 A 4/1991 Sansone
5,009,321 A 4/1991 Keough
5,025,475 A 6/1991 Okabe
5,042,667 A 8/1991 Keough
5,097,959 A 3/1992 Tilles (Continued)

FOREIGN PATENT DOCUMENTS

CA 2574809 A1 1/2006
WO 2006/008087 A1 1/2006

OTHER PUBLICATIONS

NEC; Postal Automation; 2002; 4 pages; http://www.nec.co.jp/control/en/product/postal/solution_mech.html.

(Continued)

*Primary Examiner* — Yolanda Jones
(74) *Attorney, Agent, or Firm* — Stolowitz Ford Cowger LLP

(57) ABSTRACT

Methods to solve the costly "loop mail" problem (FIG. 4, 464) in automated sorting and delivery of mail pieces are disclosed. Loop mail is detected, and marked as such (FIG. 7, 738), in an automated reject encoding machine (REM) (FIGS. 9-10). In one case, loop mail is detected where a new image of a returned mail piece is captured (702), a new destination address is read (720), and the new address does not match the bar code on the piece (732), suggesting that the previous address resolution was erroneous. The bar code is over-labeled (734) and replaced with the new postal code (736). The mail piece is marked with a loop mail indicator (738), and then returned for automated DBCS sortation (740). The loop mail indicator (810) indicates that the piece has already gone around the sorting and attempted delivery loop at least once, and is used to prevent recurrence (704, 710).

12 Claims, 9 Drawing Sheets

U.S. PATENT DOCUMENTS

| | | | | |
|---|---|---|---|---|
| 5,157,253 | A | 10/1992 | Strohmeyer | |
| 5,287,271 | A | 2/1994 | Rosenbaum | |
| 5,291,002 | A | 3/1994 | Agnew | |
| 5,311,597 | A | 5/1994 | Rosenbaum | |
| 5,341,505 | A | 8/1994 | Whitehouse | |
| 5,363,971 | A | 11/1994 | Weeks | |
| 5,369,264 | A | 11/1994 | Rosa | |
| 5,422,821 | A | 6/1995 | Allen | |
| 5,431,288 | A | 7/1995 | Nishijima | |
| 5,468,945 | A | 11/1995 | Huggett | |
| 5,518,122 | A | 5/1996 | Tilles | |
| 5,612,889 | A | 3/1997 | Pintsov | |
| 5,703,783 | A | 12/1997 | Allen | |
| 5,754,671 | A | 5/1998 | Higgins | |
| 5,841,881 | A | 11/1998 | Iwakawa | |
| 5,912,979 | A | 6/1999 | Gavrilos | |
| 6,089,613 | A | 7/2000 | Petkovsek | |
| 6,259,369 | B1 | 7/2001 | Monico | |
| 6,269,171 | B1 | 7/2001 | Gozzo | |
| 6,359,360 | B1 | 3/2002 | Lungu | |
| 6,667,802 | B2 | 12/2003 | Faus | |
| 6,671,577 | B2 | 12/2003 | Barnum | |
| 6,740,836 | B2 | 5/2004 | Ryan | |
| 6,796,433 | B2 | 9/2004 | Daniels | |
| 7,060,926 | B2 | 6/2006 | Edmonds | |
| 7,097,095 | B2 | 8/2006 | Conard | |
| 7,145,093 | B2 | 12/2006 | Mampe | |
| 2002/0109839 | A1 | 8/2002 | Faus | |
| 2003/0038065 | A1 | 2/2003 | Pippin | |
| 2003/0136713 | A1 | 7/2003 | Lopez | |
| 2003/0226789 | A1 | 12/2003 | Shiibashi | |
| 2004/0120347 | A1 | 6/2004 | Lee | |
| 2005/0209977 | A1 | 9/2005 | Avant | |
| 2006/0017758 | A1 | 1/2006 | Nambudiri | |
| 2006/0036347 | A1* | 2/2006 | DeWitt et al. | 700/224 |
| 2007/0177184 | A1 | 8/2007 | Boston | |
| 2008/0049972 | A1 | 2/2008 | Blackwell | |
| 2008/0110810 | A1* | 5/2008 | Brandt | 209/584 |
| 2008/0164185 | A1 | 7/2008 | Stemmle | |
| 2008/0230449 | A1 | 9/2008 | Stemmle | |
| 2010/0218118 | A1 | 8/2010 | Bronkema | |
| 2011/0192770 | A1 | 8/2011 | Goertz | |

OTHER PUBLICATIONS

NEC; Online/Offline combined OCR/VCS; 2002; 3 pages; http://www.nec.co.jp/control/en/product/postal/product__nav.html.

NEC; Letter Sorting Machine; 2002; 2 pages; http://www.nec.co.jp/control/en/product/postal/product__nbs.html.

NEC; Carrier Sequence Bar Code Sorter (Semi-automatic Type); 2002; 2 pages; http://www.nec.co.jp/control/en/product/postal__ncs.html.

NEC; Integrated Letter Sorting Machine; 2002; 4 pages; http://www.nec.co.jp/control/product/postal/product__ilps.html.

NEC; Flat Sorting Machine/NFS Series; 2002; 3 pages; http://www.nec.co.jp/control/en/product/postal/product__nfs.html.

Siemens; Integrated Reader Video System; 2006; 2 pages; http://www.industry.siements.com/postal%2Dautomation/en/products__solutions/products__IRV.htm.

Siemens; Format separating, facing and cancelling machines; 2006; 2 pages; http://www.industry, siemens.com/postal%Dautomation/en/products__solutions/products__format__facing__cancelling.htm.

USPS; Postnet Barcodes; Designing Letter and Reply Mail, Ch. 4; Jun. 2003; 11 pages; http://pe.usps/gov/text/Pub25/Pub25ch4.htm.

USPS; Automation Addressing; Designing Letter and Reply Mail, Ch. 3; Jun. 2003; 10 pages; http://pe/usps/gov/text/Pub25/Pub25ch3.htm.

Stolowitz Ford Cowger LLP List of Related Matters dated Dec. 23, 2011.

Stolowitz Ford Cowger LLP, "Listing of Related Cases", Apr. 22, 2011, 2 pages.

* cited by examiner

LOOP MAIL PROCESSING

RELATED APPLICATIONS

This application is a non-provisional of U.S. Provisional Patent Application No. 61/243,777 filed Sep. 18, 2009 and incorporated herein by this reference.

COPYRIGHT NOTICE

©2009-2010 RAF TECHNOLOGY, INC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This invention pertains to mail processing and, more specifically, to addressing the problem of "loop mail."

BACKGROUND

Loop Mail is the USPS's internal term for mail that goes out for delivery and is returned by the carrier because it was determined that the delivery point assigned by the OCR engine is not the one intended by the sender. Loop mail pieces can be caused by OCR errors as well as by incomplete, ambiguous, or invalid destination addresses.

Currently, all loop mail is sorted by hand, which is a very expensive process. This is done because of the possibility that a loop mail piece that is reprocessed by an OCR engine will again be assigned to the same incorrect address, and thereby continue to loop repeatedly through the system.

SUMMARY OF THE DISCLOSURE

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one aspect of the disclosure, a method is described for processing a mailpiece that was returned as undeliverable, the method comprising the steps of: receiving the returned mailpiece into a reject encoding machine; and in the reject encoding machine, automatically performing the following steps under software control— capturing a digital image of the returned mailpiece; if the mailpiece does not bear a loop mode indicator, reading a new destination address of the mailpiece based on the captured digital image; if the destination address is resolvable, determining whether or not a destination barcode on the mail piece is readable; if the destination barcode is readable, determining whether the new address matches the destination bar code; and if the new address matches the destination bar code— over-labeling the mailpiece so as to cover an existing bar code label;

marking the mailpiece for manual handling only; and directing the mailpiece to special manual handling for loop mail.

On the other hand, if a new address is resolved from the new image, it may be used to correctly label and route the mail piece. In this aspect, the method may include over-labeling a front side of the mail piece; printing a new postal code on to the mail piece responsive to the new address; marking the mail piece with a predetermined loop mail indicator; and then transferring the mail piece to an automated DBCS sorting process.

In another aspect of the disclosure, a method is described for processing a mailpiece that was returned as undeliverable, the method comprising the steps of: receiving the returned mailpiece into a reject encoding machine; and in the reject encoding machine, automatically performing the following steps under software control— capturing a digital image of the returned mailpiece;

inspecting the captured digital image to determine whether the mailpiece bears a predetermined loop mode indicator;

if the mailpiece bears a loop mode indicator, over-labeling the mailpiece so as to cover an existing bar code label;

marking the mailpiece for manual handling only; and directing the mailpiece to special manual handling as loop mail.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
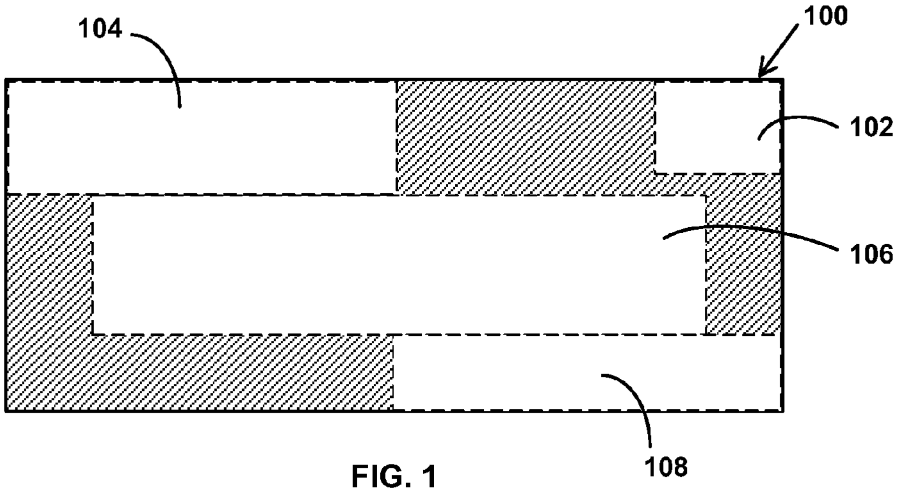
FIG. 1 is a front view of an envelope showing a POSTNET clear zone.

The following discussion uses the United States Postal Service (USPS) as an example of a mail system in which various aspects of the invention may be used. The example is illustrative and not intended to be limiting except where expressly stated. Aspects of the invention are fully applicable in other countries as well.

We have discovered that because of the differences between OCR engines, rerunning a loop mail piece through a different OCR system will frequently yield a different result from the original assignment. Furthermore, even if the same OCR engine is used, a different assignment may result due to sensitivity to small variations in the image scan. Using that new result will avoid further "looping" of the mail and indeed is likely to lead to a successful delivery to the intended destination address.

The present disclosure takes advantage of this fact by applying the following process to automatically re-sort loop mail. In one embodiment, Loop mail is fed through a mail transport and images are forwarded to RAF's OCR engine. (RAF Technology, Inc. is the assignee of the present application.) The engine attempts to read the address on the mail piece and obtain a 5-, 9-, or 11-digit ZIP code assignment based on the OCR read. If such an assignment is obtained, it is compared to the clear zone barcode on the mail piece and or the zip result found in the ID tag if the clear zone bar code is blackened out (which was used to route the mail piece previously, and hence is known to be incorrect)

If the OCR read (i) matches previous result exactly, or (ii) matches the previous result's carrier route, or (iii) matches the previous result's delivery post office (ZIP 5), the mail piece is flagged as "MANUAL ONLY" or the like and sorted into a separate bin (since it was clearly headed back again to the delivery post office where it had been returned from). It will then be processed manually. (It will be up to USPS' cost analysis to determine whether criteria (i), (ii) or (iii) is the most efficient.)

If the OCR makes a new assignment that does not match the previous result, the mail transport will over-label the old barcode (i.e., automatically apply a label to cover up the barcode) and spray the new assigned barcode on the label. In addition, it will spray a unique loop mail identifier (e.g., "LPML") into the clear zone read area of the mail piece next to the barcode or above it.

If the same mail piece is once again returned as loop mail, the OCR engine will detect this identifier and mark these mail pieces "MANUAL ONLY", regardless of OCR and barcode reads (since they have already been through the system once). This will prevent mail pieces from continuously looping through the system alternating between a number of incorrect assignments.

We expect that this process will substantially reduce the need to sort loop mail pieces manually and will ensure that pieces that are attempted in automation that need to be put in to a manual flow will be removed from automation after one automated loop run. More detail and practical implementations follow.

Delivery Bar Code Sorter (DBCS) sorts mail in the order of a mail carrier's delivery route. This order is called the Delivery Point Sequence (DPS).

POSTNET (POSTal Numeric Encoding Technique) barcode is used to encode zip code information on letter mail. Output Sub-System is (OSS). Newly labeled mailpieces may be sent to and run through a system running in an Input Sub-System (ISS) mode (e.g., a MLOCR or Advanced Facer Canceller System (AFCS) may be running in ISS mode or a DBCS may have been modified with an ISS kit).

Remote computer read (RCR) refers to using algorithms on computers that are separate from the mainstream mailpiece sorter machine. Remote Encoding Center (REC) refers to a physical facility where mail is processed.

Reject Encoding Machine (REM) is any of various machines and associated software described herein for use in processing mailpieces where the mainstream sorting process did not succeed. Advanced OCR recognition system refers to a system for optical character recognition that employs advanced recognition software algorithms for resolving an address of a mailpiece. REM machines are further explained below.

Referring now to the drawings, FIG. 1 is a front (address side) of mailpiece 100 having several areas reserved for addressing. With reference to FIG. 1, mailpiece 100 has postage area 102, optical character recognition (OCR) read area 106, POSTNET clear zone 108, and return address area 104. By way of example, if address 314 (FIG. 3) is located within OCR read area 106, a multiline optical character reader (MLOCR) may be able to resolve address 314 and print a Postal Numeric Encoding Technique (POSTNET) barcode, such as POSTNET barcode 300 (FIG. 3), in POSTNET clear zone 108.

Figure 2:
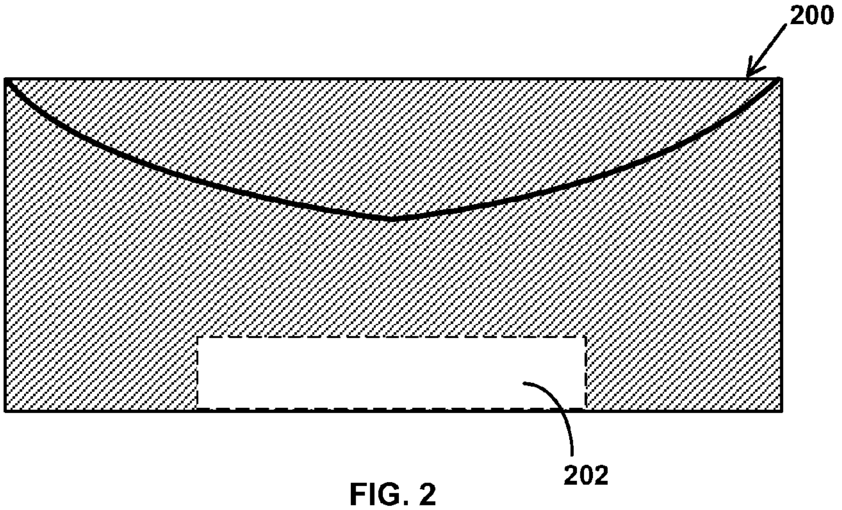
FIG. 2 is a rear view of an envelope showing a ID Tag clear zone.

With reference to FIG. 2, ID Tag clear zone 202 is on the rear side (back side) of mailpiece 200. A unique ID Tag (not shown) may be applied to the back of mailpiece 200 (in ID Tag clear zone 202) to allow data to be matched with mailpiece 200 in subsequent automated operations. For example, if address 314 cannot be read by an OCR, an image may be captured and sent to a Remote Encoding Center (REC). A keyer (manual input person) at the REC can input data, such as the zip code 304 and plus-four code 306, into a database. The ID Tag allows the data to be matched with the specific mailpiece and POSTNET barcode 300 to be applied downstream (e.g. by an Output Sub-System).

Figure 3:
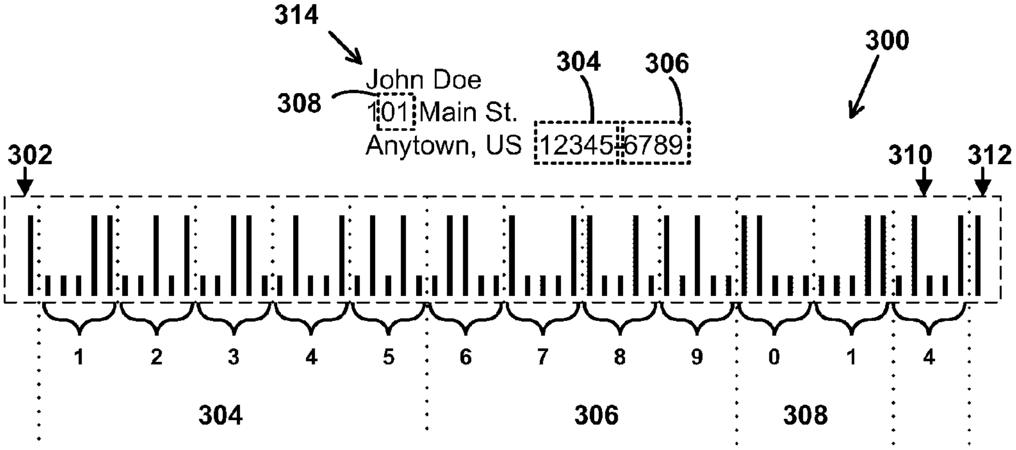
FIG. 3 is a POSTNET barcode illustrating an eleven-digit delivery point barcode.

Referring now to FIG. 3, POSTNET barcode 300 corresponds to address 314. Frame bars 302 and 312 begin and end the barcode sequence. POSTNET barcode 300 is an eleven-digit delivery point code representing zip code in field 304, plus-four code in field 306, delivery point code at field 308, and finally a check digit 310. Delivery point code 308 may be a specific set of digits between 00 and 99 such as the last two digits of a street address. The delivery point code 308, zip code 304, and plus-four code 306 result in a unique, numeric identifier for nearly every address served by the United States Postal Service (USPS). Check digit 310 essentially is a form of redundancy check used for error detection. Other POSTNET barcodes may also be applied to POSTNET clear zone 108, such as a nine-digit barcode representing zip code 304 and plus-four code 306, a five-digit barcode representing zip code 304, or a 4-state barcode where the bars represent four states (e.g., four lengths) instead of just two states (e.g., two lengths).

Although bar codes are currently in use by the USPS and are discussed herein by way of example, the inventive concepts disclosed in this application could be applied as well to systems and methods that employ other machine-readable or optically readable codes or markings in the POSTNET clear field and or in the ID Tag field. We will use the term machine-readable indicia or "MRI" in the claims in this broader sense; MRI includes but is not limited to bar codes. It applies as well to other markings that can be applied to an article by automated machinery (printed, sprayed, etc.) and conversely can be recognized or read by machine.

Figure 4:
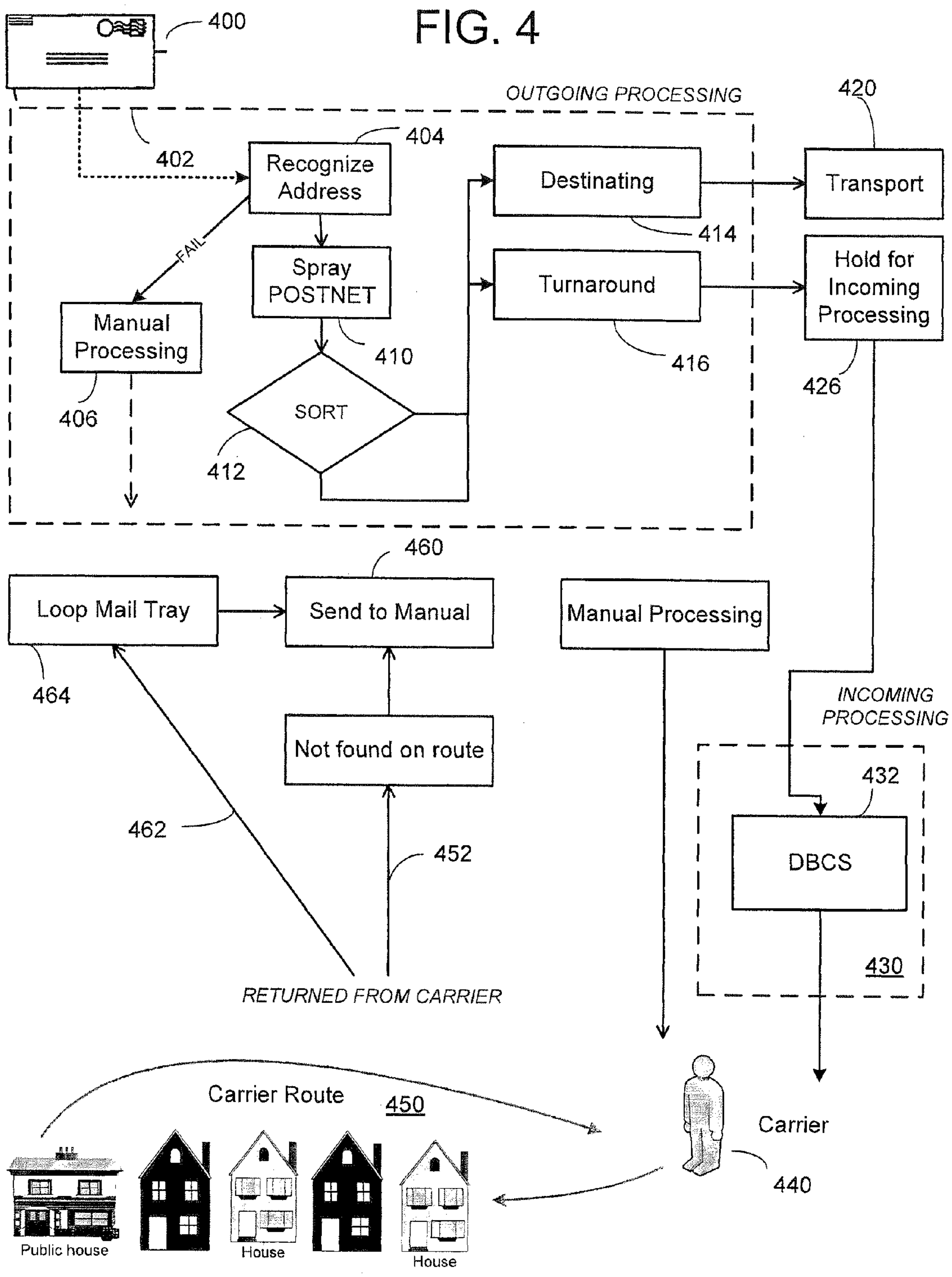
FIG. 4 is a simplified high-level flow diagram showing pertinent aspects of processing mail pieces.

FIG. 4:

Referring now to FIG. 4, an incoming mail piece 400 enters an outgoing process indicated by dash line 402. The mail piece, generally in among a batch of mail, undergoes an automated address recognition process 404. If the destination address on the mail piece cannot be recognized, it may be directed to a manual processing 406, described in more detail elsewhere. If the destination address is recognized successfully, a POSTNET bar code is sprayed on the front of the envelope, block 410, in the POSTNET clear zone 10 (FIG. 1). Then the piece proceeds to a preliminary sorting process 412 where, based on the POSTNET information, the mail piece is directed to a "destinating" mail batch 414 or a "turnaround" mail batch 416. Destinating mail indicates that the destination of the mail is not within the service boundaries of the facility at which this mail piece is being processed. Accordingly, the destinating mail proceeds to a transportation, block 420, to the appropriate destination facility for further processing. Alternatively, turnaround mail, block 416, will be held for incoming mail processing at the same facility, along with other incoming mail, block 426.

Incoming mail processing is indicated generally at dashed box 430. Incoming mail, which may have been transported from a remote facility, or turnaround mail, enters the DBCS at block 432. In the DBCS (destination barcode carrier sort) process 432, mail pieces are sorted into bins by carrier route for delivery. The mail pieces for a given carrier are then retrieved by that carrier 440, who then proceeds to deliver the mail to the destination address along that individual's carrier route 450. If the destination address is not found on that carrier's route, or the mail is not deliverable for any other reason, the mail piece is returned to the processing facility indicated by arrow 452, and then submitted for manual processing 460. In some cases, further described below, it may be determined that a mail piece is a loop mail piece. For example, the carrier may recall seeing the same piece and being unable to deliver it previously. In this case, it is returned by the carrier arrow via 462, to a loop mail tray 464. The loop mail is then submitted for manual processing at 460, with the additional information that it is now known to be loop mail.

Figure 5A:
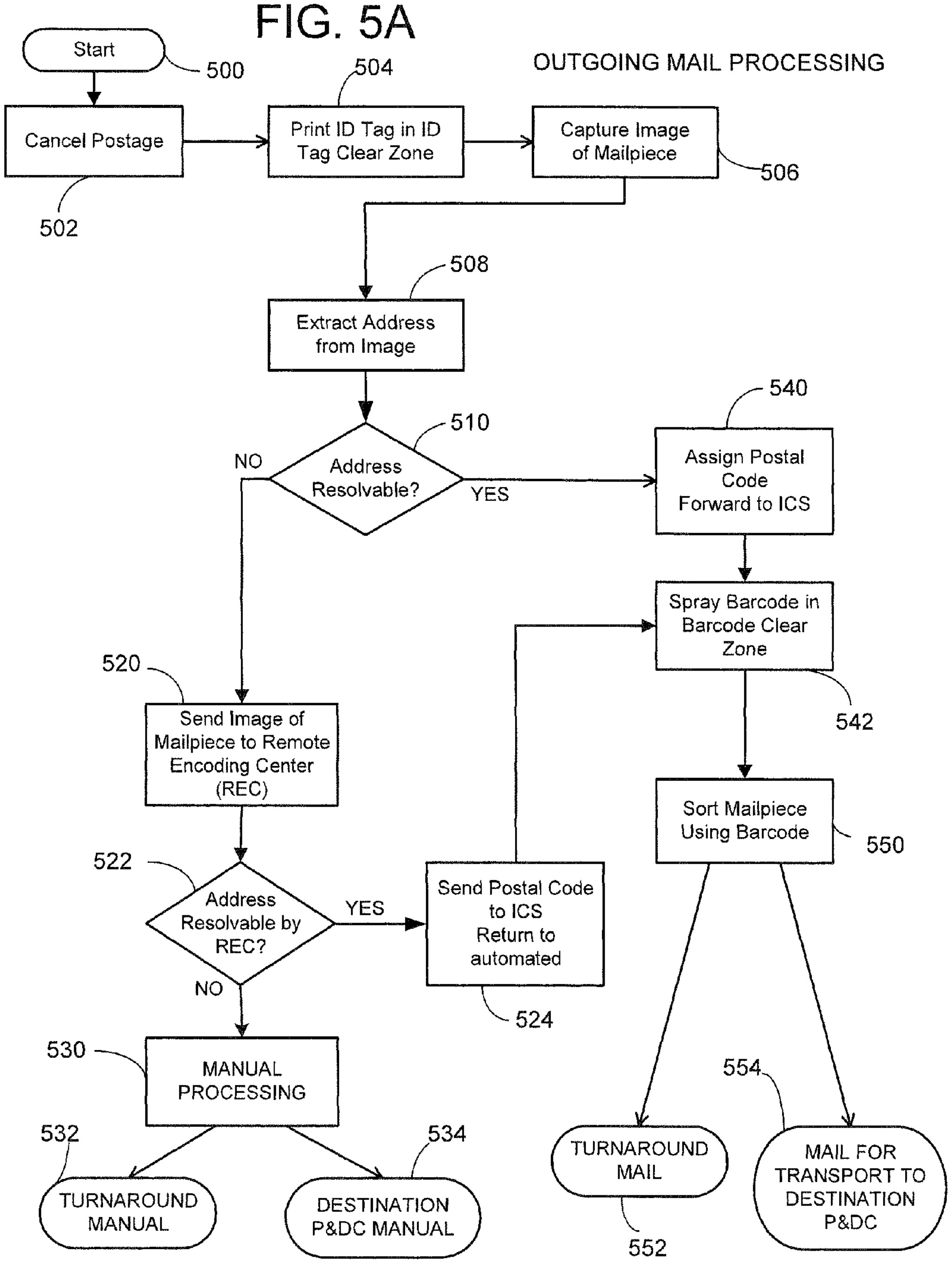
FIG. 5A is a simplified flow diagram showing an example of outgoing mail processing.

FIG. 5A:

FIG. 5A is a simplified flow diagram showing more detail of an outgoing mail process. This describes a typical processing of outgoing mail as it is initially processed at a centralized facility. We begin at 500, where mail is received for processing. This mail flows in from collection points, post offices etc. from the area served by this processing facility. The mail is processed on an Input Sub System, or ISS where an ID tag is sprayed or printed on the back side of the envelope, block 504, in the ID tag zone identified as 14 in FIG. 2. The ID tag contains a unique identifier that may be used throughout the process of delivering the mail piece.

Next, an image is captured, block 506, of at least the front side or address side of the mail piece. The destination address is extracted from the captured image, block 508, using various address recognition technologies. At block 510, a decision is made whether the address is resolvable. If the address is not resolvable using automated processes, the image can be sent to a remote computer reading platform, RCR, and then if no resolution on to a remote encoding center (REC), block 520, for further processing. For example, the RCR may use different or more sophisticated address recognition processes and the REC can employ humans to physically key the address and run this against address matching software. At decision 522, it's determined whether or not the address is resolvable by the RCR or REC. If the address is not resolvable by the RCR or REC, the piece proceeds to manual processing, block 530. Here, a determination is made as to whether the mail piece is turnaround mail or destinating mail. Turnaround mail for manual processing is collected at block 532, and destinating mail for manual processing is collected at block 534.

Referring again to the decision at 510, if the address is resolvable by the normal recognition process 508, the piece can be sorted using automated equipment. The piece proceeds to block 540 where it is assigned a postal code based on that recognized address. The postal code is forwarded to an ICS data base (not shown) where is associated with the ID tag number that was assigned and printed at block 504. Next, block 542, the assigned postal code is sprayed onto the mail piece, in the form of a barcode or similar indicia, on the POSTNET clear zone as described earlier. Next, the piece proceeds for sorting based on the barcode, block 550. Here, it is bifurcated into either turnaround mail 552, or mail for transportation to a destinating facility, block 554.

Referring once again to the decision 522, if the destination address was resolved by the RCR/REC, the piece can be returned to automated processing. In that case, the destination postal code is transmitted to the ICS for association with the corresponding ID tag number, block 524, and then the piece is returned to automated processing, as indicated at path 526, to have the recognized barcode sprayed on the piece at block 542, and thus re-enter the automated handling stream.

Figure 5B:
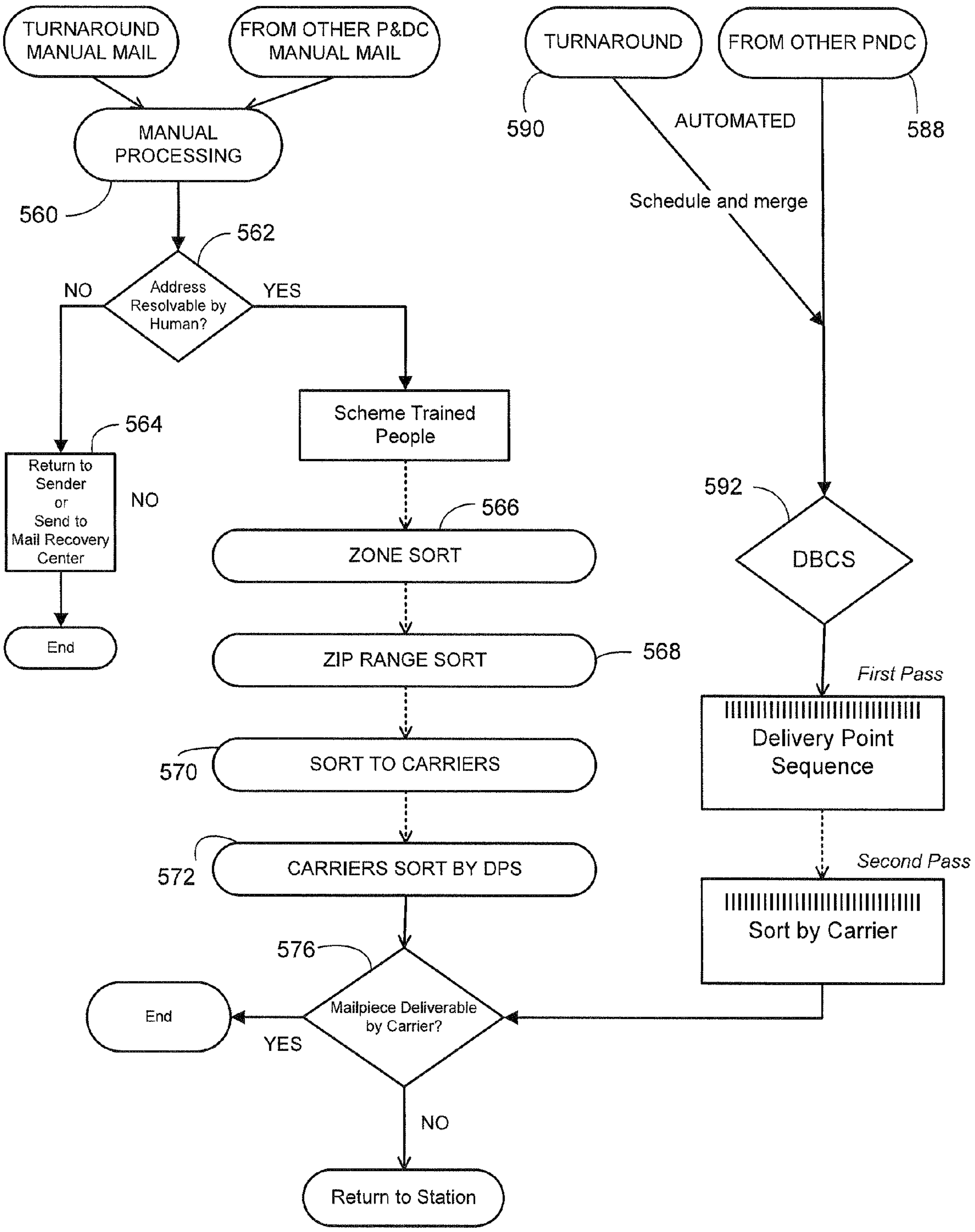
FIG. 5B is a simplified flow diagram showing an example of incoming mail processing.

FIG. 5B:

FIG. 5B illustrates processing incoming mail at a regional Processing and Distribution Center, P&DC. A manual processing operation, block 560, receives both turnaround mail from its own outgoing processing operation (532 in FIG. 5A) and destinating mail from other processing centers outgoing operations (534 in FIG. 5A) which has been designated for manual processing. At decision 562 it is determined whether or not the address is resolvable by a person. If not, the mail piece may be returned to the sender or sent to a mail recovery center, block 564.

On the other hand, if the destination address can be determined in the manual processing, the mail pieces are directed to scheme trained people for a zone sorting, block 566. Here, the mail pieces may be sorted by zip code. Next, the mail pieces may be collected by zip code ranges, block 568. For example, zip code ranges may correspond to local post offices. Next, the pieces for each zip code range may next be sorted to the carrier level, block 570.

Subsequently, each carrier may further sort his or her assigned mail by delivery sequence, block 572. The carriers then attempt to deliver the mail. If a mail piece cannot be delivered, it is returned by the carrier to the local office, block 576. The mail may be returned as undeliverable for a variety of reasons. There may be bins for collecting this mail by categories. For example, there may be a loop mail tray for mail pieces that the carrier recognizes as loop mail. Another tray may be mail that is undeliverable because the addressee has moved. In another case, the destination address may not be found on the carriers route, etc.

Turning now to the automated processing, turnaround mail from this center's outgoing operation 590 as well as incoming mail from other facilities outgoing operations, 588, are input to the automated DBCS process 592 for delivery barcode sorting. For any mail pieces that cannot be sorted at the DBCS, they may diverted to other processes (not shown), or diverted for manual processing beginning at block 560. The mail pieces that are successfully sorted are sorted by delivery point sequence in a first pass, and then sorted by carrier in a second pass. Then the sorted pieces are taken by the corresponding carriers to attempt delivery, block 576.

Figure 6:
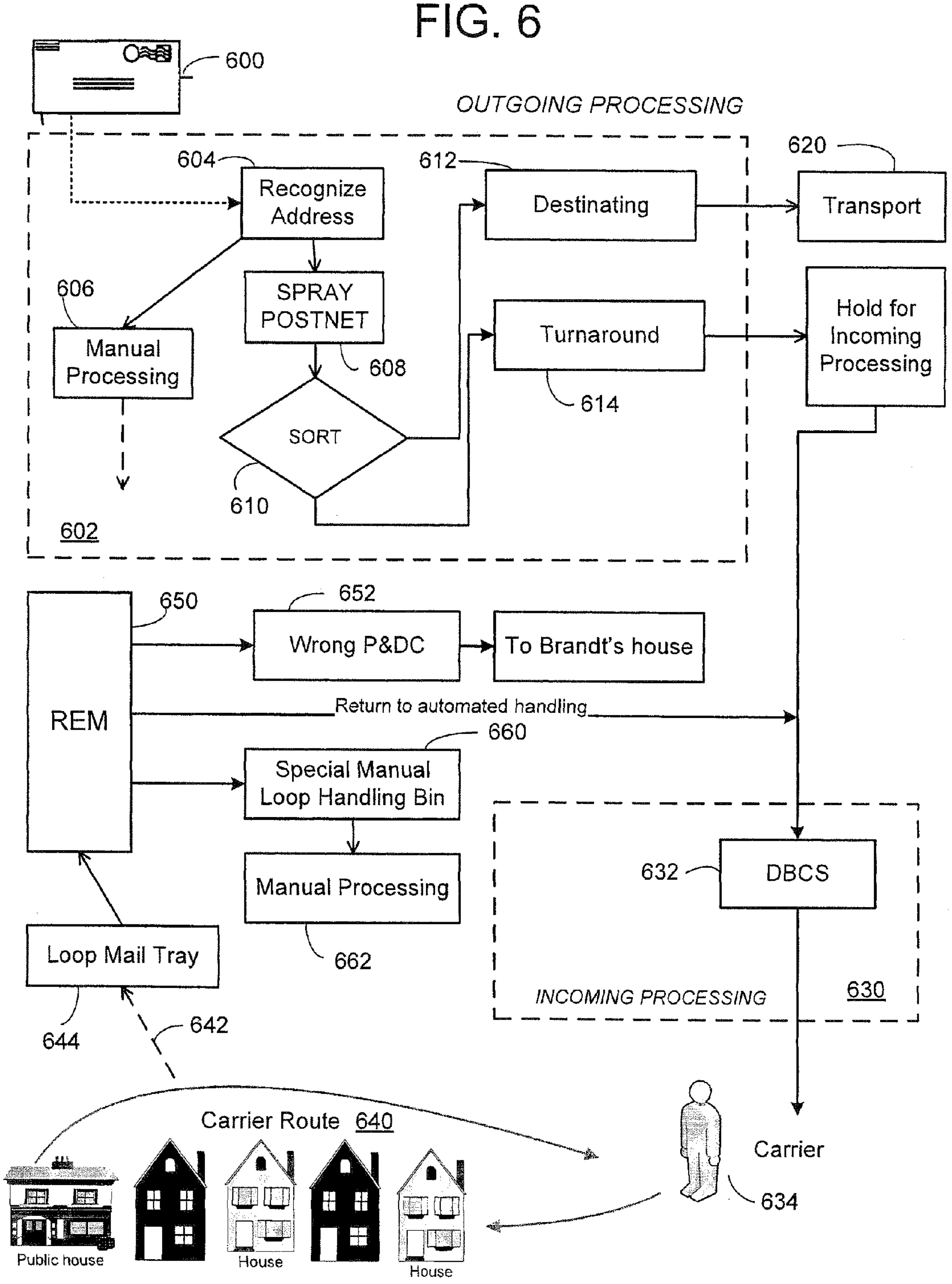
FIG. 6 is a high-level flow diagram illustrating handling of loop mail in a mail processing facility.

FIG. 6:

Referring to FIG. 6, a mail piece 600 undergoes address recognition, block 604. If the destination address cannot be recognized, the mail piece is diverted to manual processing, block 606. If the address is recognized successfully, the corresponding POSTNET barcode is sprayed onto the piece, block 608. Next, the mail piece is sorted, at decision 610, into either a destinating mail 612 or turnaround mail 614, as mentioned previously. The destinating mail will be forwarded, block 620, to the appropriate facility.

Turnaround mail is submitted to incoming processing indicated by dashed box 630. There, the turnaround mail, and the other incoming mail from all other facility's destination operations destined for that region handled by this sort center, undergoes DBCS, block 632. It is then forwarded to the appropriate carrier 634 for delivery on the carrier's route 640. If the carrier determines that a mail piece cannot be delivered, and moreover it appears to be loop mail, it's returned as indicated at arrow 642 to a loop mail tray 644.

The loop mail from 644 is input to a special processing machine, indicated as REM 650 (Reject Encoding Machine). An example of a REM is further described below. The REM 650 effectively sorts the mail into one of several categories. First, it may determine the mail is at the wrong processing facility, block 652, and it may need to be forwarded. Second, the REM may determine that this is loop mail, and direct it to a special manual loop handling bin 660, from which it proceeds to manual processing 662. In another case, the REM 650 may determine that the piece should be further processed as turnaround mail in the present facility. A process for making this determination is described below with regard to FIG. 7. In this case the piece is input into the DBCS 632 for automated processing.

Figure 7:
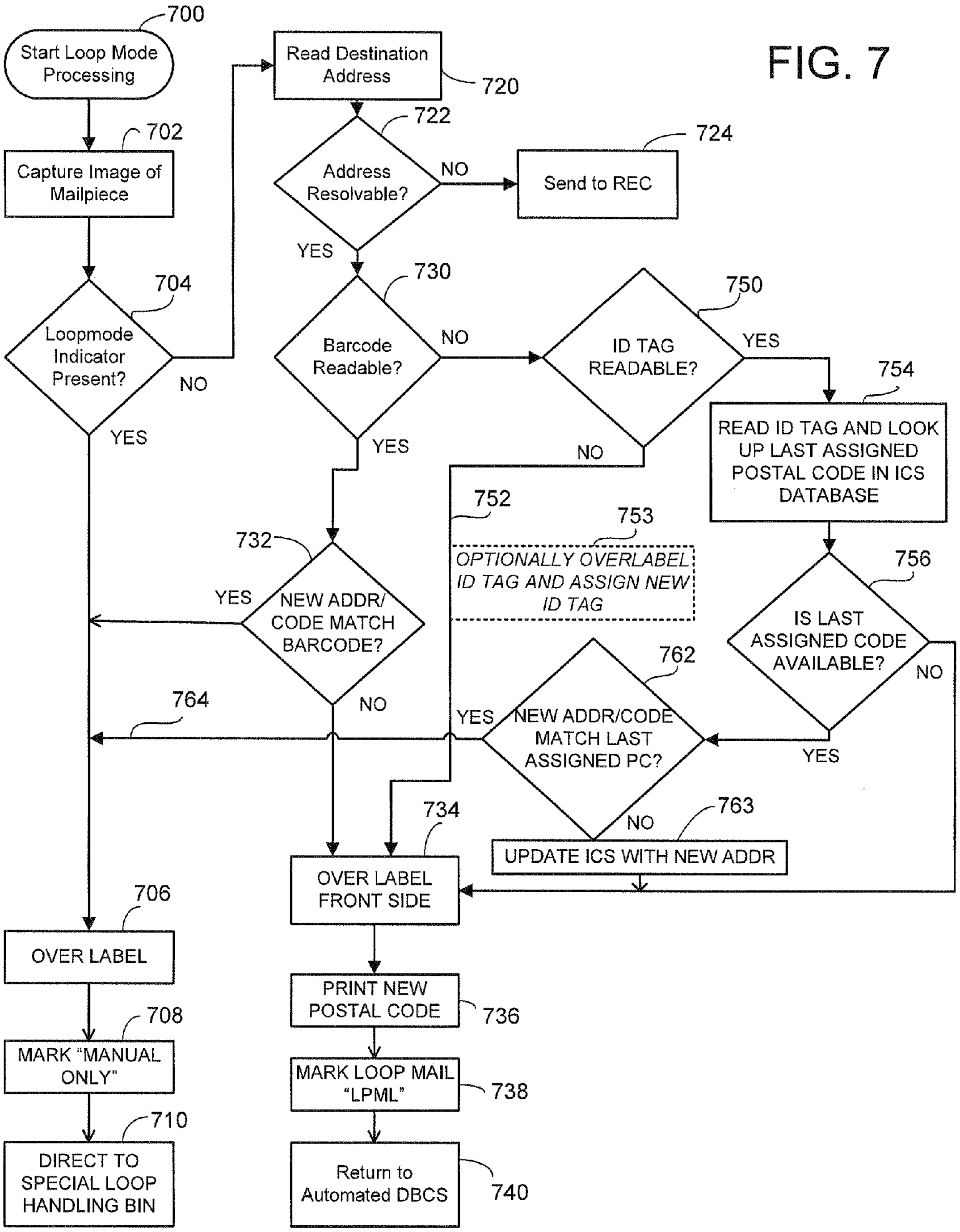
FIG. 7 is a simplified flow diagram showing one embodiment of an automated process for handling loop mail to avoid repeated looping of a piece of mail.

FIG. 7:

Referring now to FIG. 7, a simplified flow diagram describes operation in the REM machine. REM machines can be used for various tasks. Here, the REM is set to loop mode processing at 700. An image of the front of the mail piece, is captured, block 702. In addition, an ID Tag on the back side is captured or read. Note this is a new image, not the one previously captured and stored during previous processing. Then the image is inspected to determine whether or not a loop mode indicator is present, decision 704.

If a loop mode indicator is detected on the envelope, it indicates that the piece has already circulated through the REM Loop Mode at least once, without success. To avoid repeated looping through the system, the destination barcode or POSTNET code is covered by over labeling, block 706. The mail piece is then directed to a special bin and marked "manual loop only" or some indicator to that effect, so that it does not again enter automated processing. And then, the specially marked mail piece is directed to a special loop mail handling bin or output block 710, where it exits the REM machine for manual processing.

Referring again to decision 704, if the loop mode indicator is NOT present on the envelope, the process proceeds to read the destination address, block 720. This involves OCR and other address recognition techniques described elsewhere. If the address is resolvable, decision 722, the next step is taken. Alternatively, if the address is not resolvable, the mail piece may be sent to the REC for further processing, block 724. In some embodiments, the REC site is notified that the piece is loop mail so that is can process the piece in accordance the concepts disclosed in this application.

If the address is resolvable, the process continues to a decision 730 as to whether the barcode is readable, referring to the barcode in the POSTNET clear zone on the front of the envelope. If the barcode is readable, the process continues at decision 732 where a comparison is made between the new address, which was resolved from block 720, and the POSTNET code which was read at decision 730. If these two pieces of information match, it indicates that the new address determined in the REM (720) is the same as the address that was previously read in earlier processing—at least to the ZIP code level. So there would be no benefit to returning the piece to loop around again.

In this case, the process proceeds to over labeling, block 706. On the new label, a marking is sprayed that indicates "manual loop only" or some words or indication to indicate that this mail piece has gone through additional recognition with the same improper result that failed in an attempted delivery at least once in the past, unsuccessfully. There is no benefit to routing the piece once again to the same destination as before, as one might expect it will be undeliverable as before. Accordingly this mail piece is specially marked, block 708, and then directed to a special handling output bin on the REM machine, block 710.

Figure 8:
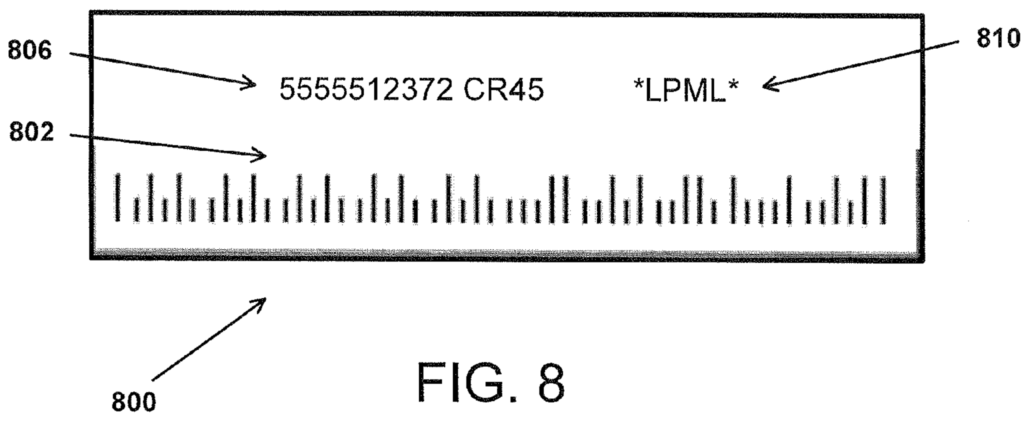
FIG. 8 shows an example of a POSTNET zone of a mail piece with a loop mail indicator.

Referring once again to decision 732, if the new destination address code does NOT match the existing barcode, the process continues to an over labeling, at block 734. In this case, the new destination postal code (determined at block 720) is sprayed on to the new label, block 736. In addition, this piece is marked with a loop mail indicator, for example the letters "LPML" or any other alphanumeric and/or graphic indicator to indicate that this piece has gone through the automated loop mail processing system at least once. The loop mail indicator may be applied in the POSTNET clear zone as illustrated on FIG. 8.

Because a new destination address has been determined for this piece, it is then returned for automated processing, for example to the DBCS, block 740. The piece may be successfully delivered based on the new address. In that case, expensive manual processing is avoided. If this mail piece is again returned as undeliverable, the loop mail indicator will be present, and therefore the piece will be handled as described above. In this way, the processing "loop" is broken.

In the case where the barcode is not readable at 730, the process determines at decision 750, whether or not the ID tag is readable. If the ID tag is not readable, and therefore cannot be used to identify the piece, the process proceeds via path 752 to the over labeling, block 734, for handling as just described. This piece, duly marked with a new destination code and a loop mail indicator, can be returned for automated sorting, block 740.

Optionally, the REM machine may over label and spray a new ID Tag, block 753, before the piece returns to automated processing. The REM may also update the RBCS (ICS) with the new result.

Referring once again to the decision 750, if the ID tag on the piece is readable, the process reads the ID tag and looks up the last assigned postal code associated with that ID tag number in the ICS data base, block 754. If the last assigned code is available in the data base, decision 756, the process proceeds to a decision, 762, as to whether or not the new address (determined at block 720) matches the last assigned postal code as indicated in the ICS database. If these two items match, it indicates that the destination address as currently read is the same as that previously read. In this case, the process continues, path 764 to the over labeling, block 706, and subsequent manual handling. In other words, since the piece has already been determined to be undeliverable at the assigned address, this process avoids sending it around the loop yet again. If the new address does not match the previous postal code, the ICS may be updated, block 763, with the new address, in association with the corresponding ID Tag.

Returning to the decision block 756, if the last postal code assigned is not available in the ICS database, the addresses cannot be compared, so the process proceeds to the over labeling at block 734. Here, the new destination postal code will be applied, block 736, the piece marked with a loop mail indicator as above, and returned to automated processing, block 740. In addition, the ICS could be updated with the new result to ensure if the Postnet becomes unreadable on the DBCS that the new result could be pulled from the ICS for sortation.

FIGS. 9-10:

In a typical application, the REM machine will employ address recognition software that is different from the software used for address recognition in the ordinary high-volume sorting process. Consequently, the address determined on the mail piece may differ from that previously determined in the automated processing. If it is different, as determined at decision 732 or 736 above, the new information is applied and the piece is returned for automated destination sorting. However, it is marked with the loop mail indicator so that it can only go back through the automated process once.

Figure 9:
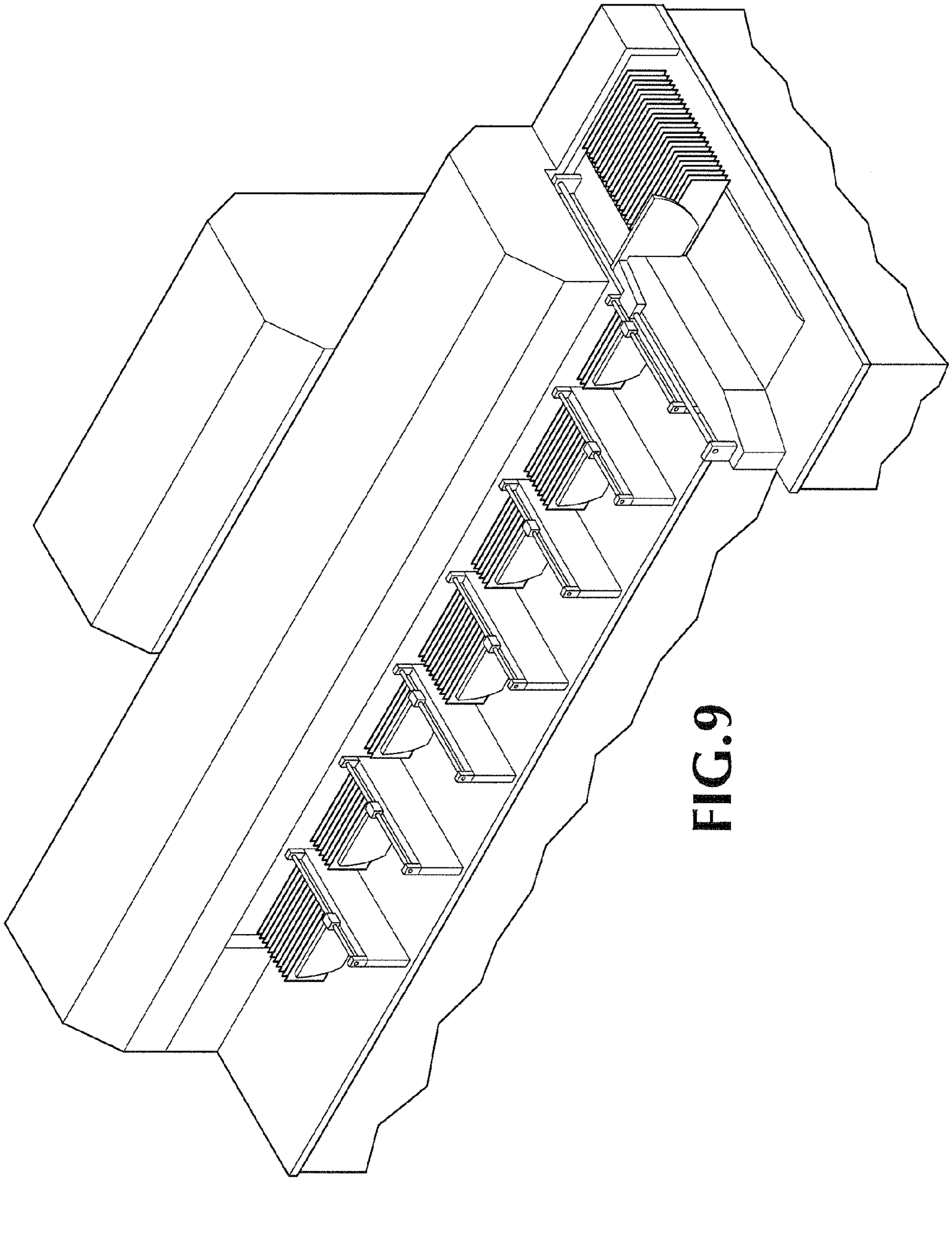
FIG. 9 is a photograph of an example of a REM machine.
Figure 10:
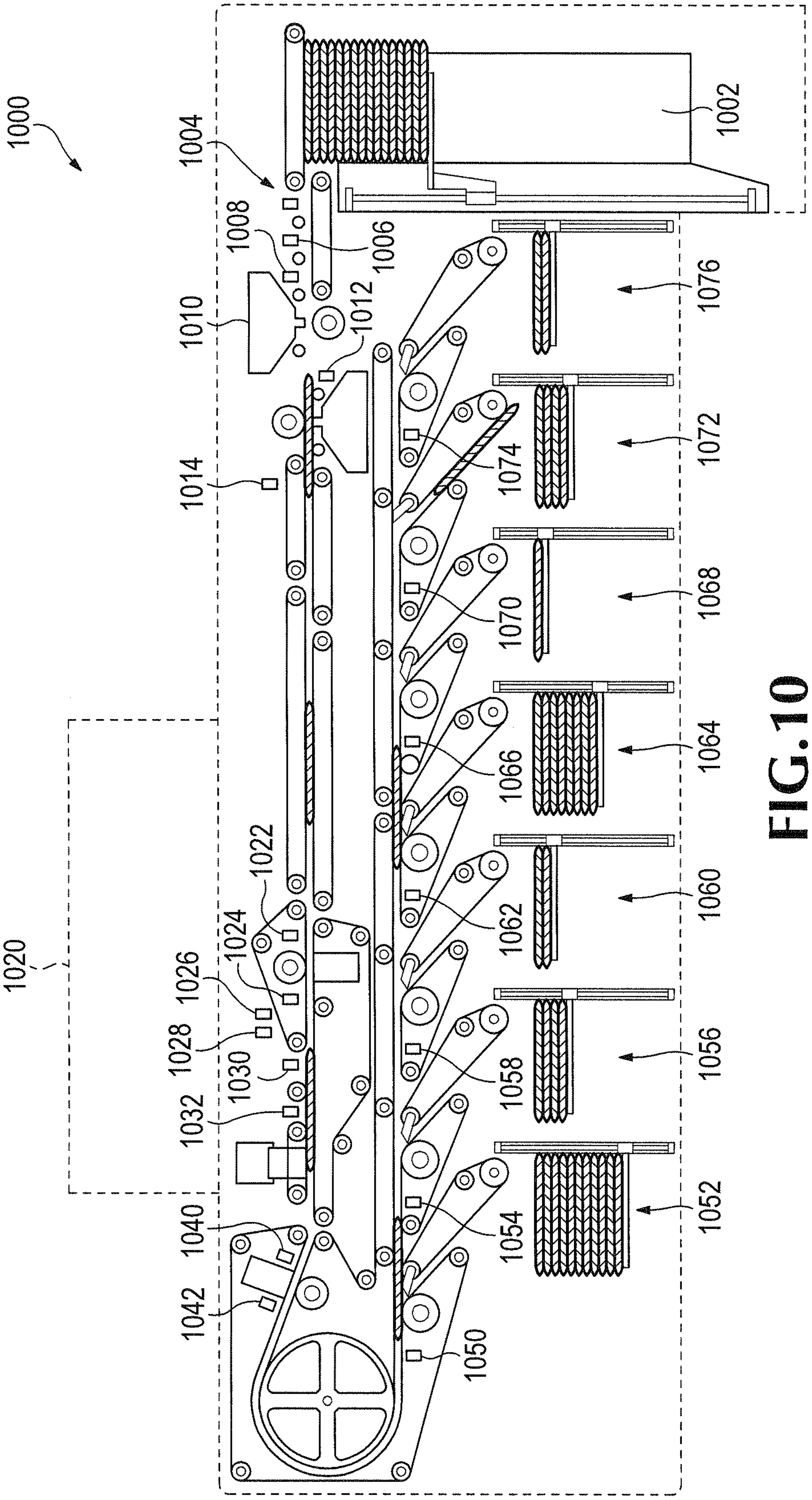
FIG. 10 is a simplified top view of the principal internal components of the REM machine of FIG. 9.

FIG. 9 is a photograph of an example of a REM machine. FIG. 10 is a simplified top view of the main internal components of the REM machine of FIG. 9. Referring to FIG. 10, a REM machine 1000 comprises, in one embodiment, an intake feed tray 1002, Feed Stage Sensor 1004, Feed Exit Sensor 1006, Right Imager Trigger Sensor 1008, Left Imager Trigger Sensor 1012, Printer Justifier Sensor 1014, Labeler 1020, Fluorescent Reader Trigger Sensor 1022, ID Tag Label Trigger Sensor 1024, Labeler Transport Stage Sensor 1026, Postnet Label Trigger Sensor 1028, Printer Sensor 1030, Printer Trigger Sensor 1032, Postnet Verifier Sensor 1040, U-Turn Entry Sensor 1042, Bin 1 Gate Sensor 1050, Output Bin 1, 1052, Bin 2 Gate Sensor 1054, Output Bin 2, 1056, Bin 3 Gate Sensor 1058, Output Bin 3, 1060, Bin 4 Gate Sensor 1062, Output Bin 4, 1064, Bin 5 Gate Sensor 1066, Output Bin 5, 1068, Bin 6 Gate Sensor 1070, Output Bin 6, 1072, Bin 7 Gate Sensor 1074, and Output Bin 7 at reference 1076. The various drive belts and related parts are known in the art so they are not described in detail. Mail pieces are illustrated with cross hatching.

It will be obvious to those having skill in the art that many changes may be made to the details of the above-described embodiments without departing from the underlying principles of the invention. The scope of the present invention should, therefore, be determined only by the following claims.

The invention claimed is:

1. A method for processing a mailpiece returned as undeliverable, the method comprising the steps of:
- receiving the returned mailpiece into a reject encoding machine;
- in the reject encoding machine, automatically performing the following steps under software control—
- capturing a digital image of the returned mailpiece;
- inspecting the captured digital image to determine whether the mailpiece bears a predetermined machine-readable loop mode indicator;
- if the mailpiece does not bear a loop mode indicator, reading a new destination address of the mailpiece based on the captured digital image;
- if the new destination address is resolvable, determining whether or not a destination barcode on the mailpiece is readable;
- if the destination barcode is readable, determining whether the new destination address matches the destination barcode; and
- if the new address matches the destination barcode—
  - over-labeling the mailpiece so as to cover an existing barcode label;
  - marking the mailpiece for manual handling only; and
  - directing the mailpiece to manual handling.

2. The method according to claim 1 and further comprising, in the reject encoding machine, automatically performing the following steps under software control:
- if the mailpiece bears a machine-readable loop mode indicator, over-labeling the mailpiece so as to cover an existing barcode label;
- marking the mailpiece for manual handling only; and
- directing the mailpiece to manual handling.

3. The method according to claim 1 and further comprising, in the reject encoding machine, automatically performing the following steps under software control:
- if the new address does not match the destination barcode—
- over-labeling a POSTNET clear zone of the mailpiece,
- printing a new postal code on to the mailpiece responsive to the new address;
- marking the mailpiece with a machine-readable loop mail indicator; and
- transferring the mailpiece to an automated DBCS sorting process.

4. The method according to claim 1 and further comprising, in the reject encoding machine, automatically performing the following steps under software control:
- if the destination barcode is not readable and an ID tag is not present on the mailpiece or is not readable,—
- over-labeling a front side of the mailpiece;
- printing a new postal code on to the mailpiece responsive to the new address;
- marking the mailpiece with a machine-readable loop mail indicator; and
- transferring the mailpiece to an automated DBCS sorting process.

5. A method for processing a mailpiece returned as undeliverable, the method comprising the steps of:
- receiving the returned mailpiece into a reject encoding machine;
- in the reject encoding machine, automatically performing the following steps under software control—
- capturing a digital image of the returned mailpiece;
- inspecting the captured digital image to determine whether the mailpiece bears a predetermined machine-readable loop mode indicator;
- if the mailpiece does not bear a loop mode indicator, reading a new destination address of the mailpiece based on the captured digital image;
- if the new destination address is resolvable, determining whether or not a destination barcode on the mail piece is readable;
- if the destination barcode is readable, determining whether the new destination address matches the destination barcode; and
- if the new address matches the destination barcode—
  - over-labeling the mailpiece so as to cover an existing barcode label;
  - marking the mailpiece for manual handling only; and
- directing the mailpiece to manual handling; and,
  - in the reject encoding machine, automatically performing the following steps under software control:
- if the destination barcode is not readable but the ID tag is readable—
  - reading the ID tag to acquire a unique identifier of the mailpiece;
  - accessing a database (ICS) to determine whether a last-assigned postal code associated with the unique identifier is available;
  - acquiring the last-assigned postal code from the database;
  - determining whether the new destination address matches the last-assigned postal code; and
  - if the new destination address matches the last-assigned postal code—
  - over-labeling the mailpiece so as to cover an existing barcode label;
  - marking the mailpiece for manual handling only; and directing the mailpiece to special manual handling for loop mail.

6. A method for processing a mailpiece returned as undeliverable, the method comprising the steps of:

receiving the returned mailpiece into a reject encoding machine;

in the reject encoding machine, automatically performing the following steps under software control— capturing a digital image of the returned mailpiece;

inspecting the captured digital image to determine whether the mailpiece bears a predetermined machine-readable loop mode indicator;

if the mailpiece does not bear a loop mode indicator, reading a new destination address of the mailpiece based on the captured digital image;

if the new destination address is resolvable, determining whether or not a destination barcode on the mailpiece is readable;

if the destination barcode is readable, determining whether the new destination address matches the destination barcode; and if the new address matches the destination barcode— over-labeling the mailpiece so as to cover an existing barcode label;

marking the mailpiece for manual handling only;

directing the mailpiece to manual handling;

and, in the reject encoding machine, automatically performing the following steps under software control:

if the destination barcode is not readable but the ID tag is readable— reading the ID tag to acquire a unique identifier of the mailpiece;

accessing a database (ICS) to determine whether a last-assigned postal code associated with the unique identifier is available; and if the last-assigned postal code is not available— over-labeling a POSTNET clear zone of the mailpiece, printing a new postal code on to the mailpiece responsive to the new destination address;

marking the mailpiece with a machine-readable loop mail indicator; and transferring the mailpiece to an automated DBCS sorting process.

7. A method for processing a mailpiece returned as undeliverable, the method comprising the steps of:

receiving the returned mailpiece into a reject encoding machine;

in the reject encoding machine, automatically performing the following steps under software control— capturing a digital image of the returned mailpiece;

inspecting the captured digital image to determine whether the mailpiece bears a predetermined machine-readable loop mode indicator;

if the mailpiece does not bear a loop mode indicator, reading a new destination address of the mailpiece based on the captured digital image;

if the new destination address is resolvable, determining whether or not a destination barcode on the mail piece is readable;

if the destination barcode is readable, determining whether the new destination address matches the destination barcode; and if the new address matches the destination barcode— over-labeling the mailpiece so as to cover an existing barcode label;

marking the mailpiece for manual handling only;

directing the mailpiece to manual handling; and, in the reject encoding machine, automatically performing the following steps under software control:

if the destination barcode is not readable but the ID tag is readable— reading the ID tag to acquire a unique identifier of the mailpiece;

accessing a database (ICS) to determine whether a last-assigned postal code associated with the unique identifier is available;

acquiring the last-assigned postal code from the database;

determining whether the destination address matches the last-assigned postal code;

and if the destination address does not match the last-assigned postal code— updating the database with the new destination address;

over-labeling a POSTNET clear zone of the mailpiece, printing a new postal code on to the mailpiece responsive to the new address;

marking the mailpiece with a machine-readable loop mail indicator; and transferring the mailpiece to an automated DBCS sorting process.

8. A method for processing a mailpiece returned as undeliverable, the method comprising the steps of:

receiving the returned mailpiece into a reject encoding machine;

in the reject encoding machine, automatically performing the following steps under software control— capturing a digital image of the returned mailpiece;

inspecting the captured digital image to determine whether the mailpiece bears a predetermined machine-readable loop mode indicator;

if the mailpiece does not bear a loop mode indicator, reading a new destination address of the mailpiece based on the captured digital image;

if the new destination address is resolvable, determining whether or not a destination barcode on the mailpiece is readable;

if the destination barcode is readable, determining whether the new destination address matches the destination barcode; and if the new address matches the destination barcode— over-labeling the mailpiece so as to cover an existing barcode label;

marking the mailpiece for manual handling only;

directing the mailpiece to manual handling; and wherein said determining whether the destination address matches the last-assigned postal code consists of applying a selected one of predetermined matching criteria that include an exact match, a carrier route level match, and a 5-digit ZIP code match.

9. A reject encoding machine for mail processing comprising:

a digital camera arranged for image capture of at least one side of a mailpiece;

a labeler arranged for applying a label to a mailpiece;

a printer or sprayer for marking on a mailpiece;

a processor coupled to the camera, the labeler and the printer or spray; and a memory accessible to the processor and storing computer software, the software executable in the processor and configured for— inspecting the captured digital image to determine whether the mailpiece bears a machine-readable loop mode indicator;

if the mail piece does not bear a loop mode indicator, reading a new destination address of the mailpiece based on the captured digital image;

if the new destination address is resolvable, determining whether or not a destination barcode on the mailpiece is readable;

if the destination barcode is readable, determining whether the new destination address matches the destination barcode; and if the new address matches the destination barcode— controlling the labeler to over-label the mailpiece so as to cover an existing barcode label; and controlling the printer or sprayer to mark the mailpiece for manual handling.

10. The reject encoding machine according to claim 9 and wherein the software stored in the memory is further configured to control the processor to implement the steps of:

if the mail piece bears a loop mode indicator— over-labeling the mailpiece so as to cover an existing barcode label;

marking the mailpiece for manual handling only; and directing the mailpiece to manual handling.

11. The reject encoding machine according to claim 9 and wherein the software stored in the memory is further configured to control the processor to implement the steps of:

if the new address does not match the destination barcode— over-labeling a POSTNET clear zone of the mailpiece, printing a new postal code on to the mailpiece responsive to the new address;

marking the mailpiece with a predetermined loop mail indicator; and transferring the mailpiece to an automated DBCS sorting process.

12. The reject encoding machine of claim 9 and further comprising a barcode reader arranged to read an ID Tag on a back side of a mailpiece and coupled to the processor; and wherein the software stored in the memory is further configured for, if the barcode is not readable and an ID tag is not present on the back side of the mailpiece or is not readable— over-labeling a front side of the mailpiece;

printing a new postal code on to the mailpiece responsive to the new address;

marking the mailpiece with a predetermined loop mail indicator; and transferring the mailpiece to an automated DBCS sorting process.

* * * * *